TIMING SIGNAL GENERATOR

Filed July 6, 1959

2 Sheets-Sheet 1

ROBERT N. MELLOTT
ALFRED D. SCARBROUGH
INVENTORS
BY [signature]
[signature]
ATTORNEYS

ROBERT N. MELLOTT
ALFRED D. SCARBROUGH
INVENTORS

BY [signature]

ATTORNEYS 3,080,487

TIMING SIGNAL GENERATOR

Robert N. Mellott, Rolling Hills, and Alfred D. Scarbrough, Palos Verdes Estates, Calif., assignors to Thompson Ramo Wooldridge Inc., Los Angeles, Calif., a corporation of Ohio Filed July 6, 1959, Ser. No. 825,110
12 Claims. (Cl. 307—88.5)

This invention relates to apparatus for generating signals for data processing equipment, and more particularly to a new and improved system for providing clock signals which are synchronized with input signals which vary in periodicity and which may occasionally disappear.

Input data is usually fed to an electronic data processing system in synchronism with the internal operation of the system. If this is done, then as information is read in, the data provided may be stored or processed immediately without the use of special buffer equipment. A synchronized operation may be achieved by using either the input information or the internal source as a timing reference. Where a storage medium operates cyclically, for example, the storage medium may serve as the timing reference for synchronization. With a core matrix, on the other hand, the random read-out characteristics permit synchronization from within the system. When the source which is providing the data is not thus controllable, however, it can be extremely difficult to establish the desired synchronization.

For example, information derived from a magnetic tape system is subject to essentially random variations in pulse repetition rate. Such variations may be caused by minor imperfections in the drive mechanism, or by tape stretching, or by other factors. Whatever the cause, the result is that allowance must be made by the data processing system if the system is to stay in synchronism with the tape data. Modern systems often have many magnetic tape machines, from which information is read and in which it may be recorded at high speed and at widely varying times. It is, of course, desirable that the data processing system be fully synchronized and compatible with each of the magnetic tape machines.

In addition, it often happens that signals may be missing or effectively lost from the tape, either due to a failure to record or an imperfection in the tape. It is highly desirable to be able to detect the occurrence of such an error, and also to be able to operate a system despite the missing pulse.

Because of variations in the repetition rates in magnetic tapes, it is not feasible to use a fixed clock generator to control internal timing of the data processing system. Nor is it desirable to utilize a special compensating timing track to correct in some way for timing variations, or to vary the tape speed. What is needed is some arrangement which will generate clock signals having a precise relation to the signals from the magnetic tape. Such an arrangement should operate over a range of repetition rates and despite an occasional loss of signal, which loss should be indicated when it occurs.

It is therefore an object of this invention to provide an improved arrangement for generating timing signals in a data processing system.

It is another object of this invention to provide an improved clock pulse generator capable of maintaining synchronism with an input data source which provides pulses having a variable periodicity.

It is still another object of this invention to provide an improved arrangement for generating clock pulses in synchronism with pulses from a magnetic tape machine which is subject to shifts in operating frequency and to occasional signal disappearance.

It is yet another object of this invention to provide an improved system for operation with magnetic recording devices to provide an indication of the absence of signals in a regular sequence of recorded data.

These and other objects of the present invention are achieved by an arrangement in accordance with the invention which utilizes a voltage controlled oscillator and circuits for controlling the frequency of a wave provided by the oscillator in accordance with the time difference between individual pulses from the oscillator and individual input pulses from a variable frequency source, such as a magnetic tape. Specifically, in accordance with one arrangement, a voltage controlled oscillator may be utilized to control the periodicity of clock pulses generated for use in a data processing system. The clock pulses and the magnetic tape pulses may be applied separately to two inputs of a flip-flop, the output of which provides pulses of varying width, i.e. duration, which are dependent upon the relative times of occurrence of pulses on the two inputs. These variable width pulses may be applied to a control voltage generator which averages the signals according to their duration and generates a signal for controlling the oscillator. The voltage controlled oscillator therefore is in a feedback loop and is driven in synchronism with the magnetic tape pulses. The synchronism is maintained despite changes in the frequency of the magnetic tape pulses.

In accordance with a further feature of this invention, there may be included circuits for detecting and indicating the absence of input pulses from the magnetic recording unit. In one particular arrangement, a second flip-flop which is coupled to the first flip-flop and the source of clock pulses may be set to a given condition when two successive clock pulses occur without an intervening input pulse from the magnetic tape device. The second flip-flop operates the control voltage generator so as to maintain the control voltage level established by the average of the last few varying time duration pulses prior to signal disappearance.

A better understanding of the invention may be had from a reading of the following detailed description and an inspection of the drawings, in which.

Figure 1:
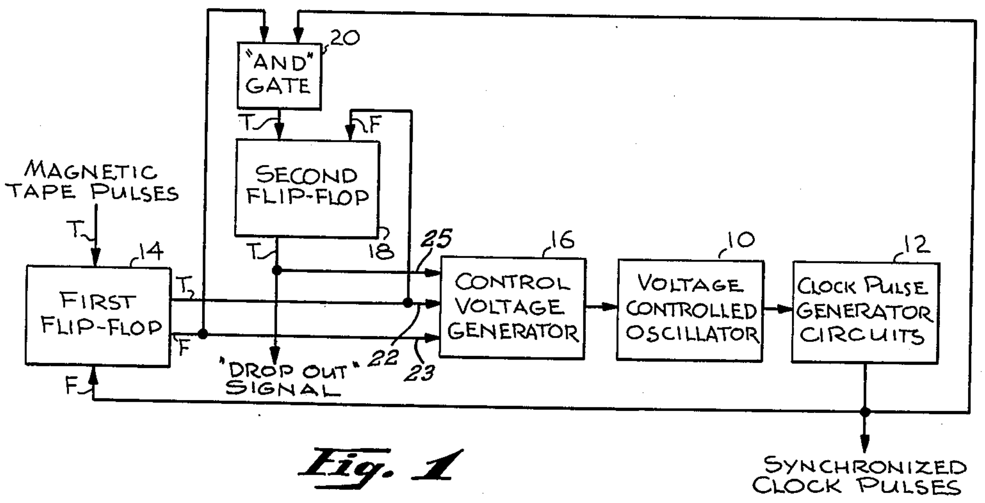
FIG. 1 is a block diagram of a clock pulse generating system in accordance with the invention.

The present system is described as it may be constructed when employed with magnetic tape machines to establish synchronism between the clock pulses for a data processing system and the pulses derived from a magnetic tape machine. The source of pulses may, however, be any other type of somewhat asynchronous device. For purposes of simplicity, the associated magnetic tape and electronic data processing equipment have not been shown. Illustrations may be given, however, of typical operating conditions under which the present invention may be used. Thus, the periodic signals from the magnetic tape with which the data processing equipment is to be synchronized may have a nominal or center frequency of 100 kilocycles. These are assumed to be signals taken from a timing track on the magnetic tape which are accompanied by interspersed character information having a higher but directly related repetition rate. The periodic signals from the magnetic tape are spaced in this example, at 10 microsecond intervals, but this is only a nominal pulse spacing because of the relatively slow acting effects discussed above which can alter the frequency of the pulses from the magnetic tape. When reference is made herein to "relatively slow" or "long-term" changes in frequency, it is intended to denote those changes which are relatively imperceptible between individual pulses but which are perceptible by the system over several or more pulses. The limits within which the center frequency varies are in practice approximately plus or minus 2%.

Signals provided from the magnetic tape are also subject to "drop out" effects which are caused by failure to record, tape imperfections, or failure to read for some reason. With densely packed information on magnetic tape, virtually any mechanical aberration will result in the loss of signal for a very brief period. This "drop out" or signal disappearance effect includes conditions in which the signal being read from the magnetic tape is of less than a selected amplitude. The "drop out" effect is thus a temporary loss of signal and in the present example includes the disappearance of signals for periods of less than approximately 500 microseconds.

A clock pulse generator system in accordance with the present invention may so control the frequency of a signal controlled pulse generator as to maintain synchronism with signals from a magnetic tape unit regardless of frequency shifts and occasional loss of signal from the magnetic tape. The system is illustrated in block diagram form in FIG. 1, to which reference may now be made. The controllable frequency source which is here employed may be a voltage controlled oscillator 10 selected for operation in the broad frequency range desired. The voltage controlled oscillator 10 includes a control input for the voltages which are to determine the frequency of operation. Outputs from the voltage controlled oscillator 10 are applied to the clock pulse generator circuits 12 which utilize the periodic signals from the oscillator 10 to generate pulses of a periodicity having a selected duration, amplitude and waveform. Thus the clock pulse generator circuits 12 may provide positive spiked shaped pulses having fast rise and fall times in synchronism with the positive going half cycles of the voltage controlled oscillator 10. The clock pulses from the clock pulse generator circuits 12 may be employed in a data processing system for the control of internal timing functions, and are also employed in the present arrangement in achieving synchronism with the magnetic tape pulses. Inasmuch as a number of alternative circuits are available to provide the periodic signal generation, signal amplification and wave-shaping functions of the oscillator 10 and the clock pulse generator 12, a detailed description of these components is omited.

The voltage controlled oscillator 10 and the clock pulse generator circuits 12 are coupled in a feedback loop which includes a first flip-flop 14 and a control voltage generator 16. As is well known to those skilled in the art, a flip-flop, such as the first flip-flop 14, is a bistable device having a pair of inputs and a corresponding pair of outputs which assumes a steady state operation in either of its stable conditions upon the application of an input which initiates that condition. For example, the first flip-flop 14 may be said to have "true" and "false" inputs and outputs (designated in FIG. 1 as T and F, respectively), and is set "true" by the application of a pulse to the T input.

In the present example, the T input is coupled to the source of pulses from the magnetic tape, and the F input is responsive to the clock pulses from the clock pulse generator circuits 12. Both outputs of the first flip-flop 14 are coupled to corresponding inputs of the control voltage generator 16. The control voltage generator 16, which is described in more detail in FIG. 3 below, averages the widths of pulses from the first flip-flop 14 to provide a signal for control of the voltage controlled oscillator 10. This averaging process is an averaging of the time varying duration of the pulses from the first flip-flop 14, and is in effect a conversion from a pulse duration form of modulation to a voltage level.

Additional circuitry cooperates with the feedback loop just described in an integrated manner to maintain synchronism despite signal "drop out" and also to indicate the occurrence of a "drop out." This additional circuitry includes a second flip-flop 18 which is set "true" from signals from an "AND" gate 20 coupled to its T input. The "AND" gate 20 is coupled to detect the coincidence of signals on the F output of the first flip-flop 14 and of clock pulses from the clock pulse generator circuits 12. The T output of the second flip-flop 18 is coupled to a switching circuit within the control voltage generator which effectively disconnects that generator 16 from the first flip-flop 14. The T output of the second flip-flop 18 is also one of the outputs from the present circuit arrangement, the presence of a signal on this output providing an indication of signal "drop out." This indication may be utilized to flash a light on a panel, to operate an automatic error monitor, or for some other form of indication.

Figure 3:
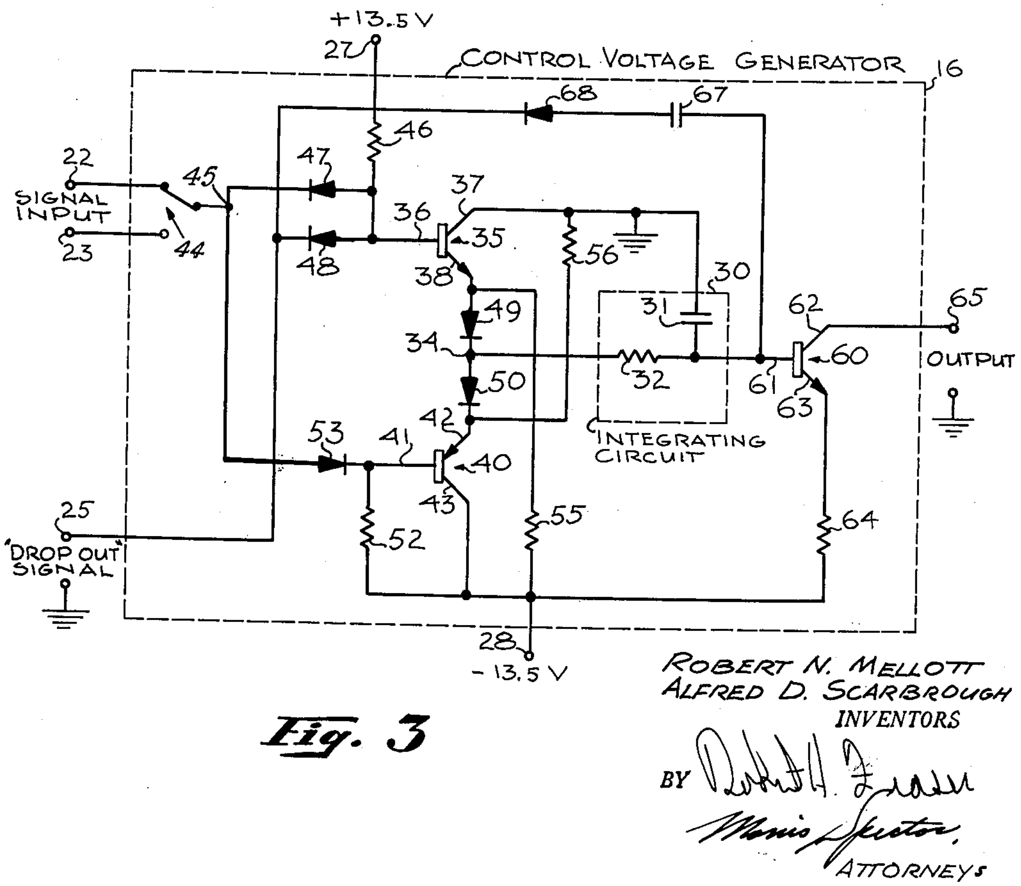
FIG. 3 is a schematic circuit diagram of one form of control voltage generator which may be utilized for the correspondingly designated unit in the arrangement of FIG. 1.

Inasmuch as several functions are performed by the control voltage generator 16, a detailed example of a circuit which may be employed for this unit has been provided in FIG. 3. The circuit there shown is particularly suitable, although other arrangements might be employed for the same purposes.

In FIG. 3, the inputs to the control voltage generator 16 are shown provided from both outputs of the first flip-flop 14 (FIG. 1) and from the "true" output of the second flip-flop 18. All of these outputs, in the present example, are assumed to vary between ground (0 volt) and −13.5 volts. Signals from the first flip-flop 14 are the signal inputs used to generate a control voltage, and are applied from the different outputs of the first flip-flop 14 to first and second input terminals 22 and 23, respectively. Signals from the T output of the second flip-flop 18 are applied to a third input terminal 25. Power sources are provided by means of a +13.5 volt D.C. supply terminal 27 and a −13.5 volt D.C. supply terminal 28. Inasmuch as the control voltage generator 16 functions properly regardless of which one of input terminals 22 or 23 is connected to diodes 47 and 53 thereof, a single pole double throw switch 44 can be utilized to couple one of the input terminals to circuit junction 45. It will be henceforth assumed that the switch 44 remains in the position illustrated in FIG. 3.

The control voltage generator 16 averages the signal inputs from the first flip-flop 14 by use of an integrating circuit 30 including a capacitor 31 and a coupled resistor 32. One terminal of the capacitor 31 is coupled to the common ground connection.

The terminal of the resistor 32 which is not coupled to the capacitor 31 is connected to a signal junction point 34, the potential of which is controlled in accordance with the signal sequence appearing on the input terminals 22, 25. A signal switching action is performed, principally through the disposition of first and second emitter follower transistors 35 and 40, respectively.

The first emitter follower transistor 35 has its base 36 coupled through a resistor 46 to the +13.5 volt supply 27, and also to both the first and third input terminals 22 and 25 through a pair of individual diodes 47, 48 respectively. The diodes 47, 48 are poled negatively with respect to signals from either of the first and third terminals 22, 25 to the base 36. The collector 37 of the first emitter follower transistor 35 is coupled to ground and the emitter 38 is coupled through a first isolating diode 49 to the signal junction 34. The first isolating diode 49 is positively poled, considering current flow from the first emitter follower 35 to the junction 34. Likewise, the second emitter follower transistor 40 has its emitter 42 coupled through a second isolating diode 50 to the signal junction 34, the diode 50 being negatively poled as to current flow from the emitter 42 to the junction 34. The collector 43 of the second emitter follower transistor 40 is connected directly to the −13.5 volt supply 28, and the base 41 is coupled both to the −13.5 volt supply 28 through a resistor 52 and to the first input terminal 22 through a diode 53. Bias for the first emitter follower transistor 35 is provided by a resistor 55 coupling the emitter 38 to the −13.5 volt supply. The emitter 42 of the second transistor 40 is biased by a coupling through a resistor 56 to ground.

An output transistor 60 has its base 61 coupled to the integrating circuit 30, its collector 62 connected to an output terminal 65, and its emitter 63 coupled to the −13.5 volt supply 28 through a resistor 64. Note that in the exemplary circuit, the first emitter follower transistor 35 and the output transistor 60 are of the NPN type, while the second emitter follower transistor 40 is of the PNP type. However, it will be appreciated that the opposite conductivity types of transistors may be used as well by a suitable modification of the circuit to reverse the polarities of the operating voltage, the signals, and the biasing potentials.

A compensating circuit consisting of a capacitor 67 and a diode 68 are serially coupled between the base 61 of the output transistor 60 and the base 36 of the first emitter follower transistor 35. The polarity of the diode 68 is such that current can be fed back from the output transistor 60 to the first emitter follower 35.

Thus, the control voltage generator 16 is arranged to have two principal switching paths from the input terminals 22 and 25 to the integrating circuit 30. One path is a positive charging path through the first emitter follower transistor 35 and the other is a negative charging path through the second emitter follower transistor 40. A brief description of a typical signal sequence will clarify the mode of operation.

In the usual condition of operation the signal inputs from the first flip-flop 14 (FIG. 1) appear as a sequence of varying width pulses. Each −13.5 volt level on the "true" input terminal 22 is accompanied by a signal at ground potential on the "false" input terminal 23, and vice versa. Concurrently, the third terminal 25 is maintained at ground potential until a "drop out" signal occurs. Assuming a ground voltage level on the first input terminal 22, therefore, the base 36 of the first emitter follower transistor 35 is driven positively by the +13.5 volt source 27 since both of the diodes 47, 48 have their cathodes at ground potential. In accordance with emitter follower action, the base 36 becomes more positive than the emitter 38, and more current is passed by the emitter 38. Consequently, a positive voltage is directed through the first isolating diode 49 to increase the potential of the junction 34 and to charge the capacitor 31 in the integrating circuit 30. The level reached by the capacitor 31 is determined by the duration of the ground voltage level on the first input terminal 22. The extent of charging is therefore dependent upon the pulse width.

Negative pulses on the first input terminal 22 are effectively applied to the base 41 of the second emitter follower transistor 40 because of the coupling of the diode 53. These negative voltage levels at the terminal 22 back bias the diode 53, thus permitting negative pulses to appear on the base 41 from the source 28 and act to establish current through the second emitter follower transistor 40. A PNP emitter follower, such as the transistor 40, is turned off by a negative signal on the base, so that more current, and a negative pulse, appear on the emitter 42. The negative output pulse, again of a controlled duration, is applied to the junction 34 and the integrating circuit 30 through the second isolating diode 50.

Accordingly, as the signals on the first input terminal 22 vary with the outputs of the first flip-flop 14 (FIG. 1), the capacitor 31 is charged alternately in opposite directions. The change in level after each alternation is dependent upon the relative widths or time durations of the signals. Thus, a form of pulse duration to voltage level conversion takes place. In effect, the integrating circuit 30 determines the overall average, for a period of time, of the differences between the times spent at the two different signal levels. The system output, taken from the output terminal 65 coupled to the emitter 62 of the output transistor 60, is directly dependent upon the instantaneous level of the integrating circuit 30 output. The signal is, however, inverted in phase.

A "drop out" signal causes the integrating circuit 30 to retain the signal representative of the last average obtained. In the "drop out" condition the level of the first input terminal 22 is at ground and that of the second and third input terminals 23, 25 is at −13.5 volts. The base 41 of the second emitter follower transistor 40 is thus at ground, and the emitter 42 at a similar level is isolated by the second isolating diode 50 from the junction point 34. At the same time, the base 36 of the first emitter follower transistor 35 is driven negative through the coupled diode 48. Consequently, the decreased level in the emitter 38 is blocked from the junction point 34 by the diode 49. The integrating circuit 30, therefore, is disconnected from the switching circuits and remains substantially constant at the last average value attained before "drop out" occurred.

Two important features are to be noted, because these permit the control voltage generator 16 to respond rapidly but to provide a substantially constant output for a long period. First, the base current of the output transistor 60 is kept small enough to prevent appreciable drain on the integrating circuit 30. With an .047 microfarad capacitor 31 and a 470 ohm resistor 32, a relatively constant output current can be maintained for up to 500 microseconds. Second, the compensating loop consisting of the series capacitor 67 and diode 68 prevents errors from arising due to the time required to detect a "drop out," and also permits a fast acting integration. The integrating circuit 30 is driven positive during the time between loss of a signal and indication of "drop out." Accordingly, the same negative input at the third terminal 25 which signifies the presence of a "drop out" also is coupled to the integrating circuit 30 to discharge the capacitor 31 by a controlled amount. The result is the previously mentioned compensation for the initial "drop out" error.

Figure 2:
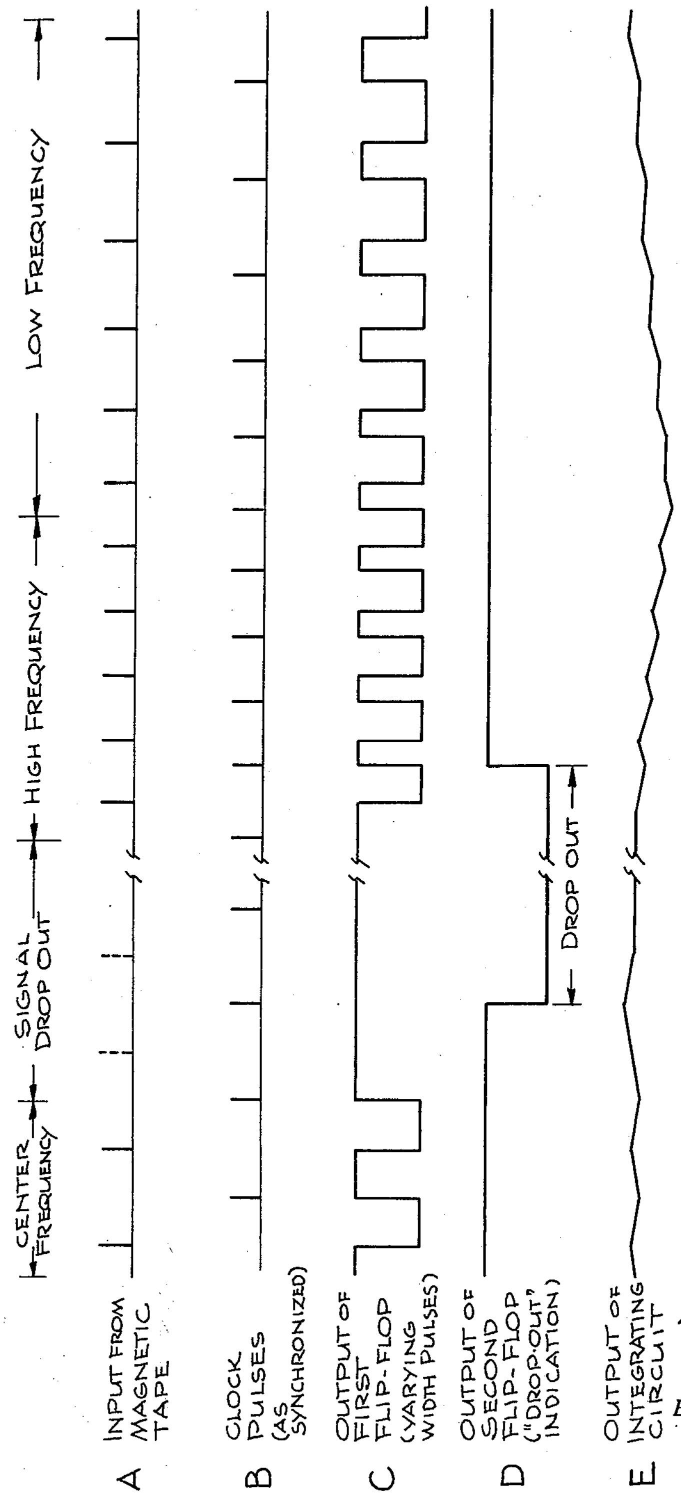
FIG. 2 is a diagrammatic representation of a number of wave forms provided at various points in a system in accordance with the invention.

An appreciation of the operation of the timing signal generator arrangement as a whole may be gained by reference to the timing diagram of FIG. 2, as well as to the circuit diagrams of FIGS. 1 and 3. FIG. 2 is a representation of typical waveforms occurring within the system for different conditions of operation. For clarity in the drawing, the various waveforms have been depicted in an exaggerated manner, and it will be understood that they represent neither precise time relationships nor scalar quantities. The actual frequency variation, for example, will be within plus or minus 2% and accordingly will usually be considerably less than the example shown in FIG. 2.

Under normal conditions, the first flip-flop 14 receives continuous sequences of periodic signals from the magnetic tape device and from the clock pulse generator circuits 12. The pulses from the magnetic tape, here referred to as the input pulses, each set the first flip-flop 14 "true." The clock pulses each reset the first flip-flop 14 by switching it to the "false" state. Equilibrium is established, and the clock pulses are in synchronism with the magnetic tape pulses, when the input pulses and the clock pulses occur alternately in a relatively stable time relationship. This condition is achieved through the generation of the control voltages from the control voltage generator 16 in response to the variable pulse width signals provided from the first flip-flop 14. The pulses of varying duration provided on the T output of the first flip-flop 14 as it alternates between its two conditions of stability represent the error signals in the feedback loop in which the first flip-flop 14 is arranged. Changes in the pulse widths provided from the first flip-flop 14 cause changes in the control voltage from the generator 16 which are arranged to have a compensatory sense so as to bring the frequency of the oscillator 10 into synchronism with the magnetic tape pulses.

These relationships may be more clearly visualized from the waveforms of FIG. 2. Waveform A in FIG. 2 corresponds to a representative sample of input pulses, in which the pulses are initially directly at an arbitrary center frequency, then subject to "drop out" for an interval, then at a slightly higher frequency than the nominal center frequency, and then progressively slowing to a somewhat lower frequency than the nominal center frequency. Waveform B in FIG. 2 shows the relative time relationship of clock pulses, the clock pulses being disposed adjacent the input pulses for ease of comparison. No attempt has been made to depict in detail the rapid searching which the feedback loop accomplishes in achieving stability between the pulse relationships. Waveform C represents the output of the first flip-flop 14, the "true" output signals being negative going signals which may be seen to be initiated by an input signal and terminated by the next succeeding clock pulse. Waveform D constitutes the output of the second flip-flop 18, the operation of which is described in greater detail below. The corrective signal within the feedback loop is provided as shown in waveform E, which represents the output of the integrating circuit 30 (FIG. 3). The control voltage generator 16 output is inverted from waveform E.

In the example of FIG. 2, the system is initially substantially on the center frequency. Thus, the first two input pulses of waveform A and the first two clock pulses of waveform B are regularly spaced, so that the width of the first two pulses in waveform C are substantially constant, and the output of the control voltage generator 16 of FIG. 1 is kept at substantially a constant level. Waveform E illustrates the somewhat triangular manner in which the integrating circuit 30 may be charged during the interval during which the variable width pulses are provided from the first flip-flop 14 of FIG. 1. Again, this signal variation has been exaggerated to depict the operation more clearly.

Omitting at this point a discussion of the signal "drop out" period, the next sequence of input pulses which are illustrated may be seen to be at a relatively higher frequency than the nominal center frequency, with the clock pulses being synchronized therewith. As the input pulses speed up relative to the clock pulses, the negative pulse from the first flip-flop, illustrated in waveform C, becomes of increasing duration. The negative charging input applied to the control voltage generator 16 becomes increasingly longer, so that the integrating circuit output, waveform E, tends to decrease in amplitude. When the frequency of the input pulses again decreases, the variable width negative pulses which are applied to the control voltage generator 16 (FIG. 1) again decrease in duration, causing an increase in the level provided by the control voltage generator 16, as is illustrated in waveform E. An important point to be noted is that the system does not attempt to equalize the phase shift between the input pulses and the clock pulses at any particular frequency. Instead, equilibrium is obtained at different phase shifts for each frequency, with the phase shift in the high frequency portion of the tolerance being greater than that in the low frequency portion. With the clock pulses in substantial synchronism with the input pulses at all times, however, this change in phase shift introduces no difficulty in the operation of the system.

The above arrangement is so constituted that little additional circuitry is needed to provide the desired indication in case of "drop out," and to maintain operation of the system for a signal disappearance of a specified interval. The first flip-flop 14 and the second flip-flop

18 in FIG. 1 together operate, in conjunction with the "AND" gate 20, to detect the successive occurrence of two clock pulses without an intervening magnetic tape input pulse. Thus, if the first flip-flop 14 is not set "true" by an input pulse before the next clock pulse is received, an "AND" gate 20 is primed by the first flip-flop 14 to pass a signal to the second flip-flop 18 to set the second flip-flop "true." The T output from the second flip-flop 18 provides the signal "drop out" indication, and the "drop out" signal for the control voltage generator 16. Until reset by an input pulse from the magnetic tape, therefore, the second flip-flop 18 maintains the integrating circuit 30 (FIG. 3) disconnected from the first flip-flop 14. Thus, the "drop out" indication of waveform D of FIG. 2 causes a substantially constant output, as shown in waveform E of FIG. 2, until operation of the first flip-flop 14 is again initiated by input pulses alternating with the clock pulses. Note, however, the momentary rise and the compensatory decrease when a "drop out" occurs. This corrective action is provided by the compensating circuit within the control voltage generator 16.

Although there have been described above and illustrated in the drawings particular arrangements of the invention for maintaining clock pulses in synchronism with the sources of variable frequency periodic signals which are subject to occasional signal disappearance, it will be appreciated that the invention is not limited to the specific illustrative arrangements. Accordingly, any modifications, variations or equivalent arrangements falling within the scope of the annexed claims should be considered to be a part of the present invention.

What is claimed is:

1. Apparatus for maintaining the operation of a clock pulse generator in synchronism with pulses of a slowly varying frequency including in combination a signal controllable oscillator coupled to the clock pulse generator for providing reference pulses for the generation of clock pulses, a bistable signal generator responsive on one input to the signals of varying frequency and on another input to the reference pulses to provide pulses having controlled durations determined by the times of occurrence of successive variable frequency and reference pulses, a control signal generator responsive to the pulses of controlled duration and coupled to the signal controllable oscillator for varying the frequency of the oscillator, and means for disabling the control signal generator upon the non-occurrence of one of said varying frequency pulses, the variable duration pulses from the bistable device and the signal controllable oscillator being coupled in a feedback loop which achieves equilibrium with a different phase shift between the varying frequency signals and the reference signals for each frequency.

2. Apparatus for detecting the absence of signals from a periodic sequence of input signals, the apparatus including in combination means responsive to the input signals for generating timing signals of substantially the same frequency as the input signals, means responsive to the timing signals and to the input signals for synchronizing the timing signals so that the timing and input signals occur alternately, and means including a bistable circuit responsive to the input signals and the timing signals for indicating the occurrence of two successive timing signals without an intervening input signal and for decoupling the timing signal generating means from the input signals.

3. Apparatus for maintaining the operation of a clock pulse generator in synchronism with input pulses having a variable repetition rate, the apparatus including in combination a controllable frequency circuit providing clock pulses, a control circuit coupled to the controllable frequency circuit and including an integrating circuit responsive to the input pulses and providing a time averaged control signal representative of the time spacing between input pulses and clock pulses, a circuit for detecting signal disappearance in the input pulses and coupled to the integrating circuit to isolate the integrating circuit upon the detection of signal disappearance, so that a constant level control signal is provided by the integrating circuit, and a compensating circuit coupled to the integrating circuit to adjust the constant level to correct for the time required to detect signal disappearance.

4. Apparatus for providing timing signals which are synchronized with pulses from a source which varies in frequency including in combination a controllable source of periodic signals, a circuit coupled to receive the periodic signals and the pulses from the source and providing pulses of varying duration, a signal generator responsive to the pulses of varying duration and coupled to control the source of periodic signals, and a circuit responsive to pulses from the source and to the pulses of varying duration coupled to disconnect the signal generator from the pulses of varying duration on the occurrence of particular signal patterns.

5. Apparatus for providing clock pulses which are in synchronism with magnetic tape pulses having a frequency characteristic which varies slowly over a range of frequencies, and which is subject to occasional loss of signal, the apparatus including the combination of a voltage controllable frequency source, a bistable signal circuit responsive to the frequency source and to the magnetic tape pulses on different inputs for operating in different stable states in accordance with the inputs which are provided, thus to provide pulses of varying duration dependent upon the time difference between individual signals from the frequency source and the magnetic tape, a voltage generator circuit responsive to the pulses of varying duration from the bistable circuit and coupled to the frequency source for providing a control voltage to the frequency source to control the frequency thereof, and a circuit coupled to the bistable signal circuit and to the frequency source for disconnecting the bistable signal circuit from the voltage generator circuit when signals occur from the frequency source without intervening pulses from the magnetic tape.

6. Apparatus for providing clock pulses which are synchronized with input pulses from a source which is subject to relatively slow-term frequency variations and intermittent signal drop out, the apparatus including in combination a controllable frequency source, means responsive to the input pulses and the controllable frequency source for providing variable duration signals dependent upon the time difference between the occurrence of successive individual input and controllable frequency source signals, a circuit responsive to the variable time duration signals for generating a control signal to control the controllable frequency source, and a circuit coupled to the control signal generator and responsive to the signals from the controllable frequency source and to the variable duration signals for providing a signal to maintain the control signal generator in its last previous condition of operation when at least two signals in succession are provided from the variable frequency source without an intervening input signal.

7. A system for maintaining a clock pulse generator in synchronism with a variable frequency source of input pulses, including in combination a voltage controllable frequency source coupled to the clock pulse generator, a control circuit coupled to the frequency source and responsive to the clock pulses and the input pulses and including a signal averaging circuit for controlling the frequency source with a signal representative of the average time duration between the input pulses and the clock pulses, a circuit responsive to the input pulses and the clock pulses and coupled to the control circuit for disconnecting the signal averaging circuit upon a temporary signal disappearance of the input pulses, and a compensating circuit coupled to the signal averaging circuit for correcting the operation of the signal averaging circuit for errors introduced in the average due to the time required to detect a signal disappearance.

8. A clock pulse generator for operation with a magnetic tape unit, the clock pulse generator providing pulses which are synchronized with the pulses from the tape unit despite variations in the frequency of the magnetic tape unit pulses, and despite loss of signal from the magnetic tape unit for a relatively brief duration, the generator comprising in combination: a voltage controlled oscillator; clock pulse generator circuits for providing timed pulses from the signals provided from the voltage controlled oscillator; a first flip-flop having first and second inputs and corresponding outputs, the first input of the first flip-flop being responsive to pulses from the magnetic tape unit and the second input being responsive to pulses from the clock pulse generator, so that the first flip-flop provides on its first output signals which are initiated by a magnetic tape pulse and terminated by the next succeeding clock pulse; a control voltage generator circuit, the control voltage generator circuit including a signal averaging circuit and a coupled switching circuit, the signal averaging circuit being responsive through the switching circuit to varying levels of the first output of the first flip-flop and providing a control voltage proportional to the average duration of the pulses from the first flip-flop; a second flip-flop having first and second inputs and corresponding outputs; a coincidence circuit coupled to the first input of the second flip-flop; and means coupling the clock pulse generator circuits and the second output of the first flip-flop to the inputs of the coincidence circuit, such that coincident signals on the coincidence circuit operate the second flip-flop so that it assumes a corresponding stable state, and means coupling the first output of the second flip-flop to the switching circuit in the voltage generator, so that the switch disconnects the first flip-flop from the control voltage generator and the signal provided to the voltage controlled oscillator is maintained at the average established for the previous group of pulses and the frequency of the clock pulse generator circuits is maintained for a selected time interval.

9. A pulse generator for operation with a magnetic tape unit, the pulse generator providing clock pulses which are in synchronism with pulses from the tape unit despite variations in the frequency of the pulses from the tape unit and despite disappearance of signals for relatively short intervals from the magnetic tape unit, the generator comprising in combination: a voltage controlled oscillator; clock pulse generator circuits coupled to the oscillator for providing pulses having selected waveform and time relations to the signals provided by the voltage controlled oscillator; a first flip-flop having first and second inputs and corresponding outputs, the first input of the first flip-flop being responsive to pulses from the magnetic tape unit and the second input being responsive to pulses from the clock pulse generator circuits; a control voltage generator including a signal averaging circuit and a switching circuit coupling the signal averaging circuit to the first flip-flop so as to provide outputs from the first flip-flop to the averaging circuit; a second flip-flop having first and second inputs and corresponding outputs, a coincidence circuit coupled to the first input of the second flip-flop and responsive to signals from the second output of the first flip-flop and to pulses from the clock pulse generator circuits, the first output of the second flip-flop being coupled to the switching circuits and the control voltage generator circuit to effectively isolate the first flip-flop from the signal averaging circuit upon actuation of the first output of the second flip-flop; and a signal compensation circuit coupled between the output of the signal averaging circuit and the input to the switching circuits to provide a compensatory effect in the operation of the signal averaging circuit for the time lost in operation of the second flip-flop following disappearance of pulses from the tape unit.

10. A circuit for generating a signal representative of the average time difference between periodic input pulses which are subject to frequency variations and clock pulses of approximately the same frequency, the circuit comprising: a signal integrating circuit; a bistable circuit responsive to the input pulses and the clock pulses coupled to provide different voltage levels for varying durations therefrom; a pair of switching circuits coupling the bistable circuit to the signal integrating circuit for charging the signal integrating circuit with pulses of alternate polarity from the different voltage levels provided by the bistable circuit; and means for preventing the charging of the signal integrating circuit by the switching circuits upon the non-occurrence of one of the periodic input pulses.

11. A circuit in accordance with claim 10 including an additional charging path for applying a predetermined charge to the signal integrating circuit to correct for changes in the potential of the signal integrating circuit caused by the operation of the last-mentioned means.

12. A circuit in accordance with claim 10 further including means for indicating the non-occurrence of a periodic input pulse and means for connecting the indicating means to the first of the pair of switching circuits in order to disable said first switching circuit while the second switching circuit of said pair is disabled by the bistable circuit.

References Cited in the file of this patent

UNITED STATES PATENTS

| | | |
|---|---|---|
| 2,552,013 | Orpin | May 8, 1951 |
| 2,646,510 | Musselman | July 21, 1953 |
| 2,700,155 | Clayden | Jan. 18, 1955 |
| 2,713,674 | Schmitt | July 19, 1955 |
| 2,816,162 | Johnson | Dec. 10, 1957 |
| 2,876,348 | Selmer | Mar. 3, 1959 |
| 2,984,789 | O'Brien | May 16, 1961 |

UNITED STATES PATENT OFFICE
CERTIFICATE OF CORRECTION

Patent No. 3,080,487 March 5, 1963

Robert N. Mellott et al.

It is hereby certified that error appears in the above numbered patent requiring correction and that the said Letters Patent should read as corrected below.

Column 5, line 68, for "off" read -- on --.

Signed and sealed this 17th day of November 1964.

(SEAL)
Attest:

ERNEST W. SWIDER
Attesting Officer

EDWARD J. BRENNER
Commissioner of Patents